(12) United States Patent
Byun et al.

(10) Patent No.: US 10,945,123 B2
(45) Date of Patent: Mar. 9, 2021

(54) METHOD AND APPARATUS FOR TRANSMITTING UE ID IN WIRELESS COMMUNICATION SYSTEM

(71) Applicant: LG ELECTRONICS INC., Seoul (KR)

(72) Inventors: Daewook Byun, Seoul (KR); Jian Xu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/790,440

(22) Filed: Feb. 13, 2020

(65) Prior Publication Data

US 2020/0260266 A1    Aug. 13, 2020

Related U.S. Application Data

(63) Continuation of application No. 15/781,098, filed as application No. PCT/KR2016/012039 on Oct. 26, 2016, now Pat. No. 10,595,195.

(Continued)

(51) Int. Cl.
*H04W 8/24* (2009.01)
*H04W 76/10* (2018.01)
(Continued)

(52) U.S. Cl.
CPC ............ *H04W 8/24* (2013.01); *H04W 4/70* (2018.02); *H04W 8/08* (2013.01); *H04W 8/26* (2013.01);
(Continued)

(58) Field of Classification Search
CPC ......... H04W 8/24; H04W 92/12; H04W 8/26; H04W 8/08; H04W 76/30; H04W 76/10; H04W 4/00
See application file for complete search history.

(56) References Cited

U.S. PATENT DOCUMENTS 9,462,555 B2 * 10/2016 Jain ................. H04L 1/1861
2012/0276913 A1  11/2012 Lim et al.
(Continued)

FOREIGN PATENT DOCUMENTS

CN       104980945 A  * 10/2015  ............ H04W 8/186
KR     1020150006274      1/2015
(Continued)

OTHER PUBLICATIONS

United States Patent and Trademark Office U.S. Appl. No. 15/781,098, Office Action dated Jun. 17, 2019, 18 pages.
(Continued)

*Primary Examiner* — Mohamed A Kamara
(74) *Attorney, Agent, or Firm* — Lee Hong Degerman Kang Waimey

(57) ABSTRACT

Provided are a method for receiving, by a base station, a user equipment identity (UE ID) in a wireless communication system, and a device for supporting the same. The base station transmits, to a mobility management entity (MME), uplink data and release assistance information transmitted by the UE and receives the UE ID from the MME, wherein the release assistance information can indicate whether transmission of downlink data according to transmission of uplink data is expected.

15 Claims, 10 Drawing Sheets

Related U.S. Application Data

(60) Provisional application No. 62/262,925, filed on Dec. 4, 2015, provisional application No. 62/267,235, filed on Dec. 14, 2015.

(51) Int. Cl.

| | | |
|---|---|---|
| *H04W 4/70* | (2018.01) | |
| *H04W 76/30* | (2018.01) | |
| *H04W 8/08* | (2009.01) | |
| *H04W 8/26* | (2009.01) | |
| *H04W 92/12* | (2009.01) | |

(52) U.S. Cl.
CPC .......... *H04W 76/10* (2018.02); *H04W 76/30* (2018.02); *H04W 92/12* (2013.01)

(56) References Cited

U.S. PATENT DOCUMENTS

| | | |
|---|---|---|
| 2014/0092799 A1 | 4/2014 | Jain et al. |
| 2014/0348129 A1 | 11/2014 | Yang et al. |
| 2015/0282082 A1 | 10/2015 | Landais et al. |
| 2018/0352424 A1 | 12/2018 | Byun et al. |
| 2018/0359803 A1 | 12/2018 | Haneji et al. |

FOREIGN PATENT DOCUMENTS

| | | |
|---|---|---|
| WO | 2013025066 | 2/2013 |
| WO | 2014146473 | 9/2014 |
| WO | 2014188694 | 11/2014 |
| WO | 2015034193 | 3/2015 |

OTHER PUBLICATIONS

European Patent Office Application Serial No. 16870916.0, Search Report dated Aug. 2, 2019, 8 pages.
Alcatel-lucent, MediaTek, NEC, "Introduction of Control, CIoT EPS optimization", S2-154277, 3GPP TSG SA WG2 Meeting #112, Nov. 2015, 23 pages.
Japan Patent Office Application No. 2018-529007, Notice of Allowance dated Apr. 2, 2019, 2 pages.
Korean Intellectual Property Office Application No. 10-2018-7015592, Office Action dated Apr. 12, 2019, 4 pages.
Alcatel-Lucent, et al., "Introduction of Control Plane CIoT EPS optimization", 3GPP TSG SA WG2 Meeting #112, S2-154451, Nov. 2015, 11 pages.
Samsung, et al., "How the UE decides to initiate low power mode?" 3GPP TSG SA WG2 Meeting #95, S2-130560, Feb. 2013, 6 pages.
Alcatel-Lucent, et al., "Introduction of Control Plane CIoT EPS optimization", 3GPP TSG SA WG2 Meeting #112, S2-154339, Nov. 2015, 11 pages.
PCT International Application No. PCT/KR2016/012039, International Search Report dated Feb. 2, 2017, 12 pages.
3rd Generation Partnership Project (3GPP), "Technical Specification Group Services and System Aspects; General Packet Radio Service (GPRS) enhancements for Evolved Universal Terrestrial Radio Access Network (E-UTRAN) access (Release 13)," 3GPP TS 23.401 V13.4.0, Sep. 2015, 336 pages.

\* cited by examiner

METHOD AND APPARATUS FOR TRANSMITTING UE ID IN WIRELESS COMMUNICATION SYSTEM

CROSS-REFERENCE TO RELATED APPLICATIONS

This application is a continuation of U.S. patent application Ser. No. 15/781,098, filed on Jun. 1, 2018, now U.S. Pat. No. 10,595,195, which is the National Stage filing under 35 U.S.C. 371 of International Application No. PCT/KR2016/012039, filed on Oct. 26, 2016, which claims the benefit of U.S. Provisional Application Nos. 62/262,925, filed on Dec. 4, 2015, and 62/267,235, filed on Dec. 14, 2015, the contents of which are all hereby incorporated by reference herein in their entirety.

BACKGROUND OF THE INVENTION

Field of the Invention

The present invention relates to a wireless communication system, and more particularly, to a method of transmitting a user equipment (UE) identity (ID) in a wireless communication system, and an apparatus supporting the method.

Related Art

In recent years, machine-to-machine/Internet of Things (M2M/IoT), which connects all every objects through networks to facilitate obtaining and transmitting necessary information anytime and anywhere, thereby making it possible to offer and use various services, has become a major issue for a next-generation communication market.

While early M2M started with a sensor and an RFID network mainly for local areas, various wired/wireless networks may be used with gradually diversifying purposes and characteristics of applications. Recently, M2M based on a mobile communication network receives growing attention in view of the mobility of objects, a wide range of service areas including not only islands and mountains but also the sea, ease of network management and maintenance, security for reliable data transmission, and guarantee of service quality. Accordingly, with studies on the feasibility of M2M started in 2005, the 3GPP has been conducting a full-scale standardization project under the name "Machine Type Communications (MTC)" since 2008.

The 3GPP regards a machine as an entity that does not require direct human manipulation or intervention and defines MTC as a form of data communication involving one or more of machines. Typical examples of the machine include a smart meter and a vending machine that are equipped with a mobile communication module. Recently, with the introduction of a smart phone that performs communication by automatically connecting to a network, without any user operation or intervention, depending on a user's location or conditions, a mobile terminal having an MTC function is considered as a form of a machine. Also, a gateway-type MTC device connected to an IEEE 802.15 WPAN-based subminiature sensor or RFID is also considered.

Internet of Things (IoT) is a future infrastructure and service of information communication for the future, in which all things are connected to the Internet to directly communicate with each other. Although the IoT is necessary to improve quality of life and productivity on the basis of a super-connected society, the IoT is important ultimately because it forms an infrastructure of a nation, and further, a central nervous system for humanity and the Earth. The IoT is in an initial stage not having a significant profit model yet. However, a market scale of the IoT as a new paradigm of the $21^{st}$ century is more than 10 times the existing cellular communication market, and is expected to grow rapidly. The IoT is roughly divided into cellular mobile communication based IoT (CIoT) and non-cellular based IoT.

SUMMARY OF THE INVENTION

A main use case of CIoT is a device for transmitting and receiving a small data packet. Therefore, a requirement to be fulfilled by a system may be to transmit/receive the small data packet efficiently. However, at present, a mobility management entity (MME) does not perform an initial context setup in "mobile originated (MO) data transport in control plane CIoT EPS optimization with P-GW connectivity". Therefore, a base station may not recognize a user equipment (UE) identity (ID) allocated by the MME to identify a UE. If an S1AP uplink non-access stratum (NAS) transport message is transmitted without the UE ID, the MME which has received the NAS transport message cannot know a specific UE by which the NAS transport message is transmitted. Therefore, the MME which has received the NAS transport message cannot determine a destination to which uplink data included in the NAS transport message will be transferred. Accordingly, there is a need to propose improved S1 signaling to receive the UE ID.

An embodiment provides a method of receiving, by a base station, a user equipment (UE) identity (ID) in a wireless communication system. The base station may transmit, to a mobility management entity (MME), uplink data and release assistance information transmitted by a UE, and may receive the UE ID from the MME. The release assistance information may indicate whether downlink data transmission subsequent to the uplink data transmission is expected.

The UE ID may be received from the MME if the release assistance information indicates that the downlink data transmission subsequent to the uplink data transmission is expected. The uplink data and the release assistance information may be included in a non-access stratum (NAS) protocol data unit (PDU). The NAS PDU may be included in an initial UE message.

The UE ID may be received from the MME if the MME does not receive data from a serving gateway (S-GW).

The UE ID may be included in a connection establishment indication message.

The UE ID may be received from the UE if the uplink data does not expect acknowledgement and the uplink data is not final data.

The base station may transmit an uplink NAS transport message including an NAS PDU to the MME on the basis of the received UE ID.

The UE may be in an EPS connection management (ECM)-IDLE state.

Another embodiment provides a method of transmitting, by an MME, a UE ID in a wireless communication system. The MME may receive, from a base station, uplink data and release assistance information transmitted by a UE, and may transmit the UE ID to the base station. The release assistance information may indicate whether downlink data transmission subsequent to the uplink data transmission is expected.

The UE ID may be transmitted to the base station if the release assistance information indicates that the downlink data transmission subsequent to the uplink data transmission is expected.

The UE ID may be transmitted to the base station if the MME does not receive data from an S-GW.

The UE ID may be transmitted to the base station if the uplink data does not expect acknowledgement and the uplink data is not final data.

Another embodiment provides a base station receiving a UE ID in a wireless communication system. The base station may include: a memory; a transceiver; and a processor coupling the memory and the transceiver. The processor may be configured to: control the transceiver to transmit, to an MME, uplink data and release assistance information transmitted by a UE; and control the transceiver to receive the UE ID from the MME. The release assistance information may indicate whether downlink data transmission subsequent to the uplink data transmission is expected.

A User Equipment (UE) identify (ID) can be provided.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
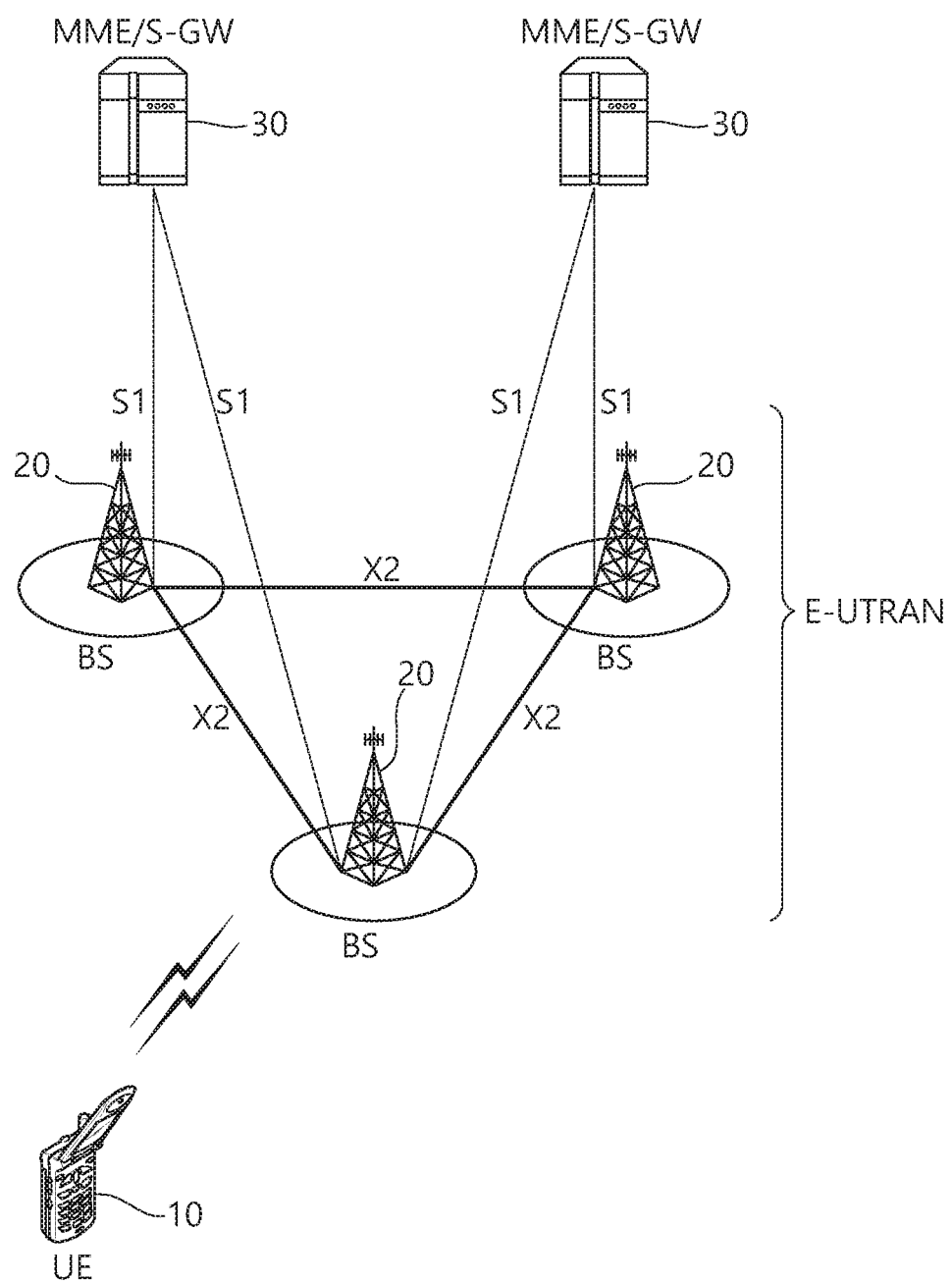
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
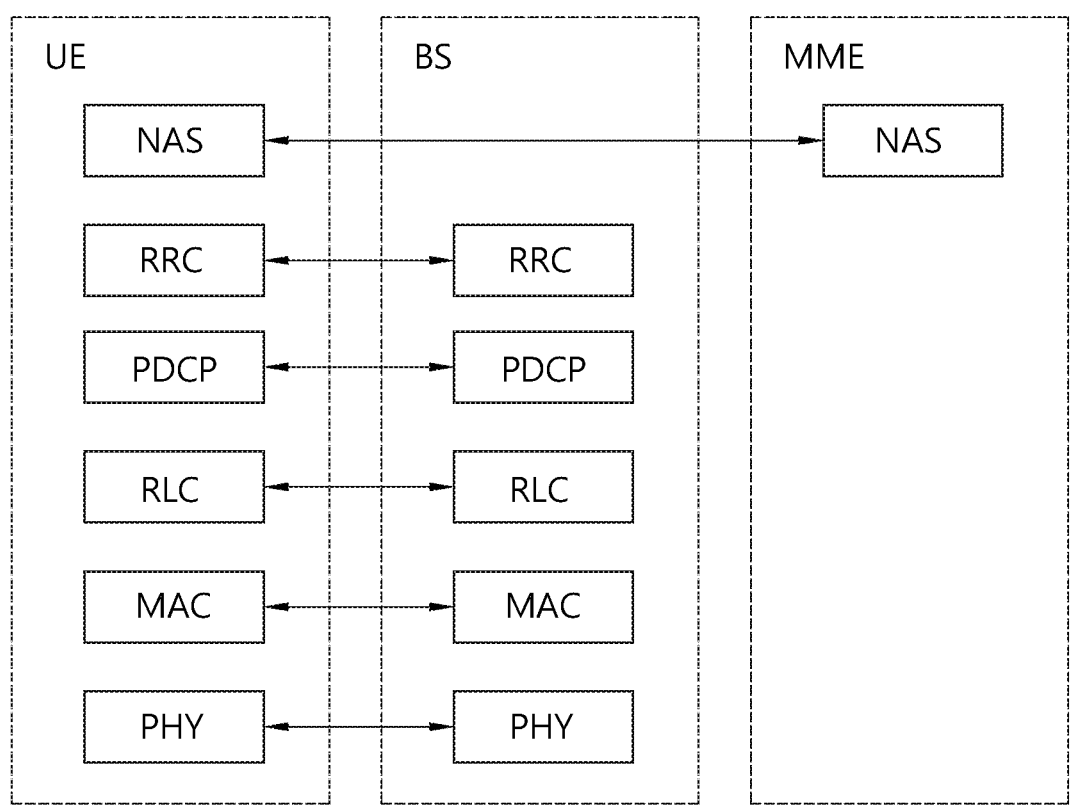
FIG. 2 shows a control plane of a radio interface protocol of an LTE system.
Figure 3:
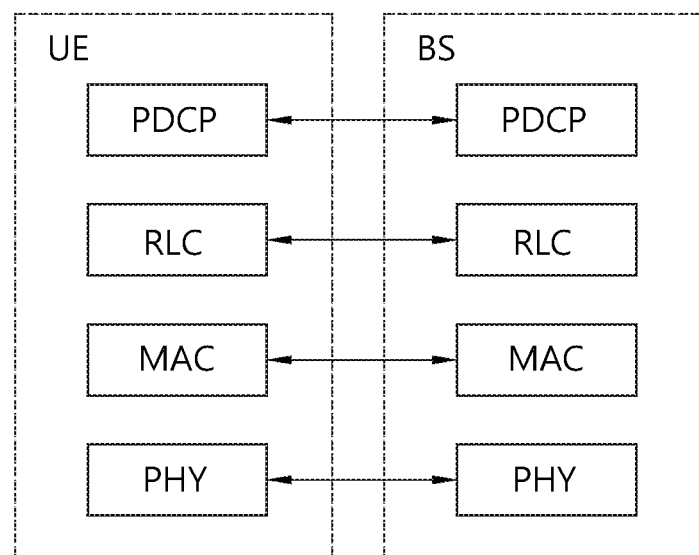
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A Non-Access Stratum (NAS) layer placed over the RRC layer performs functions, such as session management and mobility management.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, An RRC state of a UE and RRC connection procedure are described.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a process of registering to the network through an initial attach procedure. If the attach procedure is successfully performed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When the UE in the ECM-IDLE state establishes an RRC connection with the E-UTRAN, the UE enters the ECM-CONNECTED state. When the MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Hereinafter, an Initial Context Setup Procedure Will be Described.

The initial context setup procedure is used to set up required entire UE context information. The UE context information may include E-RAB context, security key, handover restriction list, UE radio capability, and/or UE security capability or the like. That is, the context information (or UE context information) may include overall UE information.

In this case, since the UE radio capability information can be transmitted when an MME has such information, the UE radio capability information cannot be transmitted when the MME does not initially know a UE.

For the initial context setup, the MME may transmit an initial context setup request message to an eNB. The initial context setup request message may be defined by Table 1.

TABLE 1

| IE/Group Name | Presence | Criticality | Assigned Criticality |
|---|---|---|---|
| Message Type | M | YES | reject |
| MME UE S1AP ID | M | YES | reject |
| eNB UE S1AP ID | M | YES | reject |
| UE Aggregate Maximum Bit Rate | M | YES | reject |
| E-RAB to Be Setup List | | YES | reject |
| >E-RAB to Be Setup Item IEs | | EACH | reject |
| >>E-RAB ID | M | — | |
| >>E-RAB Level QoS Parameters | M | — | |
| >>Transport Layer Address | M | — | |
| >>GTP-TEID | M | — | |
| >>NAS-PDU | O | — | |
| >>Correlation ID | O | YES | ignore |
| >>SIPTO Correlation ID | O | YES | ignore |
| UE Security Capabilities | M | YES | reject |
| Security Key | M | YES | reject |
| Trace Activation | O | YES | ignore |
| Handover Restriction List | O | YES | ignore |
| UE Radio Capability | O | YES | ignore |
| Subscriber Profile ID for RAT/Frequency priority | O | YES | ignore |
| CS Fallback Indicator | O | YES | reject |
| SRVCC Operation Possible | O | YES | ignore |
| CSG Membership Status | O | YES | ignore |
| Registered LAI | O | YES | ignore |
| GUMMEI | O | YES | ignore |
| MME UE S1AP ID 2 | O | YES | ignore |
| Management Based MDT Allowed | O | YES | ignore |
| Management Based MDT PLMN List | O | YES | ignore |
| Additional CS Fallback Indicator | C-ifCSFBhighpriority | YES | ignore |
| Masked IMEISV | O | YES | ignore |
| Expected UE Behaviour | O | YES | ignore |
| ProSe Authorized | O | YES | ignore |

Upon receiving the initial context setup request message, in response thereto, the eNB may transmit an initial context setup response message to the MME, and may perform the initial context setup procedure. The initial context setup response message may be defined by Table 2.

TABLE 2

| IE/Group Name | Presence | Criticality | Assigned Criticality |
|---|---|---|---|
| Message Type | M | YES | reject |
| MME UE S1AP ID | M | YES | ignore |
| eNB UE S1AP ID | M | YES | ignore |
| E-RAB Setup List | | YES | ignore |
| >E-RAB Setup Item IEs | | EACH | ignore |
| >>E-RAB ID | M | — | |
| >>Transport Layer Address | M | — | |
| >>GTP-TEID | M | — | |
| E-RAB Failed to Setup List | O | YES | ignore |
| Criticality Diagnostics | O | YES | ignore |

Hereinafter, Machine-Type Communication (MTC) Will be Described.

Figure 4:
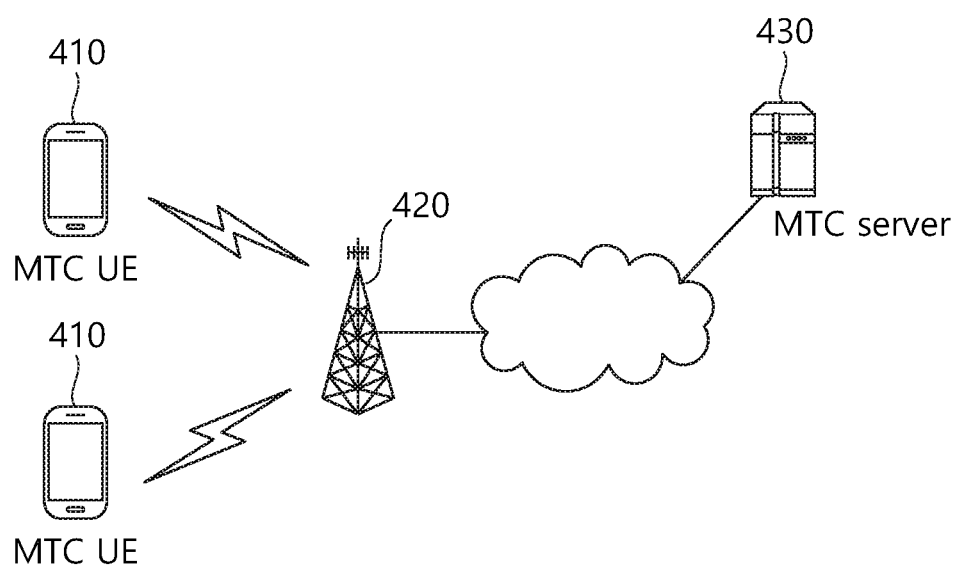
FIG. 4 shows an example of MTC.

FIG. 4 shows an example of MTC.

MTC refers to information exchange between MTC UEs 410 via a BS 420 without involving human interactions or information exchanges between an MTC UE 410 and an MTC server 430 via the BS. Services provided through MTC are differentiated from existing communication services requiring human intervention, and MTC provides a wide range of services, such as tracking, metering, payment, medical services, remote control, and the like. More specifically, services provided through MTC may include reading a meter, measuring a water level, utilizing a surveillance camera, reporting the inventory of a vending machine, and the like. Data communication-oriented low-cost/low-specification UEs that provide these services are referred to as an MTC UE or low complexity-type UE for convenience. A BS may determine whether a UE is an MTC UE based on the capability of the UE. In the present specification, an MTC UE, a low-complexity UE, a low-cost UE, and a UE Category 0 UE may be used with the same meaning, and a normal UE may be used to refer to a UE other than the listed UEs.

The MTC server 430 is an entity communicating with the MTC UE 410. The MTC server 430 runs an MTC application and provides an MTC-specific service to an MTC device. The MTC UE 410 is a wireless device that provides MTC communication and may be fixed or mobile.

Since an MTC UE has a small amount of data to transmit and is occasionally involved in uplink/downlink data transmission/reception, it is effective to reduce the cost of the UE and to decrease battery consumption thereof according to a low data transmission rate. The MTC UE is characterized by low mobility and thus has a hardly changing channel environment.

The MTC UE does not require a high-performance function and generally uses a small amount of data. The concept of UE Category 0 is introduced in order to manufacture a low-cost MTC UE. A UE category is a general number used in the 3GPP to indicate how much data a UE can process in a communication modem. Table 3 shows 3GPP UE categories.

TABLE 3

| UE Category | DL speed | UL speed | UE Category | DL speed | UL speed |
|---|---|---|---|---|---|
| 0 | 1 Mbps | 1 Mbps | 7 | 300 Mbps | 100 Mbps |
| 1 | 10 Mbps | 5 Mbps | 8 | 3 Gbps | 1.5 Gbps |
| 2 | 50 Mbps | 25 Mbps | 9 | 450 Mbps | 50 Mbps |
| 3 | 100 Mbps | 50 Mbps | 10 | 450 Mbps | 100 Mbps |
| 4 | 150 Mbps | 50 Mbps | 11 | 600 Mbps | 50 Mbps |
| 5 | 300 Mbps | 75 Mbps | 12 | 600 Mbps | 100 Mbps |
| 6 | 300 Mbps | 50 Mbps | 13 | 400 Mbps | 50 Mbps |

A UE Category 0 UE is allowed to process only 1 Mbps, making it possible to manufacture a modem without much effort and high costs, and may use only one antenna. Also, the UE Category 0 UE is allowed to perform transmission or reception only in a specified time, rather than simultaneously performing transmission and reception, and thus may operate in FDD in the same manner as in TDD. In addition, unlike in existing TDD, a sufficient switching time of about 1 ms may be assigned for a period of transition between transmission and reception, thereby remarkably reducing costs for hardware components, particularly in view of a modem and RF, overall.

MTC UEs may be installed not only in buildings and factories but also in coverage-limited places, for example, a basement. For instance, about 20% of MTC UEs supporting an MTC service, such as smart metering, may be installed in a poor 'deep indoor' environment, such as a basement. Thus, for successful MTC data transmission, it is necessary to increase the coverage of an MTC UE by about 20 dB as compared with the coverage of a conventional normal UE. Considering this situation, various coverage enhancement techniques are currently under discussion, such as a repetitive transmission method for an MTC UE by each channel/signal.

Hereinafter, Cellular Internet of Things (CIoT) Will be Described.

Internet of Things (IoT) is a future infrastructure and service of information communication for the future, in which all things are connected to the Internet to directly communicate with each other. Although the IoT is necessary to improve quality of life and productivity on the basis of a super-connected society, the IoT is important ultimately because it forms an infrastructure of a nation, and further, a central nervous system for humanity and the Earth. The IoT may be roughly divided into cellular mobile communication based IoT (CIoT) and non-cellular based IoT.

The CIoT implies cellular mobile communication based IoT. To effectively support a cellular based IoT service, MTC traffic generated intermittently and sporadically in a form of a packet having a short length must be efficiently transferred. In addition, in case of an application service having a real-time constraint, it is necessary to satisfy a delay requirement by immediately transmitting a data packet (in a grant-free form) without having to undergo a separate channel allocation procedure. Further, for a large-scale random access for the IoT service, it is necessary to decrease a device cost and power consumption, increase a coverage, and improve random access capacity and efficiency of a procedure.

A main use case of CIoT is a device for transmitting and receiving a small data packet. Therefore, a requirement to be fulfilled by a system may be to transmit/receive the small data packet efficiently. For example, battery consumption of a UE must be low when the small data packet is transmitted and received. For example, an amount of signaling required in a network and over the air must be reduced when the small data packet is transmitted and received. In case of a current CIoT control plane, mobile originating (MO) data transport is as follows.

Figure 5:
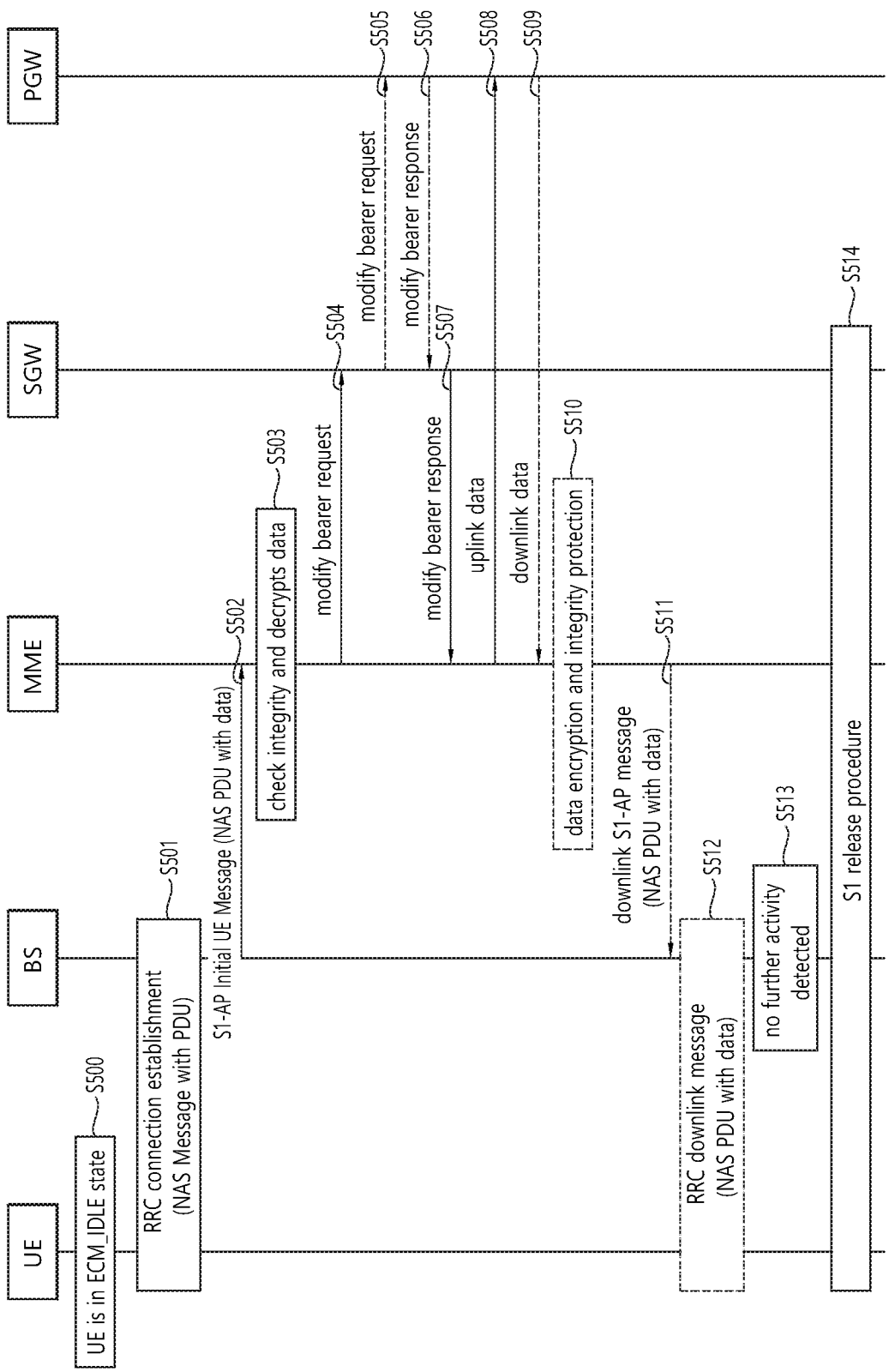
FIG. 5 shows a MO data transport procedure in NAS signaling.

FIG. 5 shows a MO data transport procedure in NAS signaling.

Referring to FIG. 5, in step S500, a UE may be in an ECM-IDLE state. In step S501, the UE may establish an RRC connection and transmit a NAS message with data to an eNB. In step S520, the NAS message may be relayed to an MME by the eNB. In this case, an S1-AP initial UE message may be used. In step S503, the MME may check integrity of a NAS message PDU and decrypt data included therein. In step S504, the MME may transmit a modify bearer request to an S-GW. In step S505, the S-GW may be able to transmit a modify bearer request to a P-GW. In step S506, the P-GW may transmit a modify bearer response to the S-GW. In step S507, the S-GW may transmit the modify bearer response to the MME. In step S508, the MME may transmit uplink data to the P-GW. In step S509, when downlink data arrives at the P-GW, the P-GW may transmit the downlink data to the MME. Although not shown in FIG. 5, while the RRC connection is activate, the UE can still transmit the uplink data through NAS messages which are carried in the S1AP uplink message. This means that, if the UE has multiple data to be transmitted, the multiple data can be transferred by an S1AP uplink NAS transport message to the MME except first data. The first data may be transmitted through an initial UE message in step S502.

However, according to the MO data transport procedure described in FIG. 5, while the RRC connection is activate, the UE may be unable to transmit uplink data through the NAS messages which are carried by the S1AP uplink message. Such a problem occurs since an initial context setup procedure is not performed in "mobile originated data transport in control plane CIoT EPS optimization with P-GW connectivity". Hereinafter, a problem which may occur when the UE has multiple data to be transmitted will be described in detail.

For example, it is assumed that, in the procedure of FIG. 5, the UE contains release assistance information without ACK for uplink data, and an indication indicates that the uplink data is not final data in the NAS message. The release assistance information without ACK for the uplink data may be information indicating that the ACK for the uplink data is not expected. In this case, the MME may know that downlink data does not exist as ACK for the received uplink data. In addition, the MME may know that additional data will be transmitted by the UE. Therefore, the MME does not transmit an S1 message to the eNB while the MME receives uplink data from the UE. Because of this MME action, however, the eNB may be unable to recognize a UE ID allocated by the MME to identify the UE. That is, since the initial context setup procedure is not performed, the eNB may be unable to recognize the UE ID allocated by the MME to identify the UE. If the S1AP uplink NAS transport message is transmitted without the UE ID, the MME which has received the NAS transport message cannot know which UE transmits the NAS transport message. Therefore, the MME which has received the NAS transport message cannot decide a destination to which uplink data included in the NAS transport message must be transferred. The above problem may also occur in a case where the UE includes release assistance information with acknowledgement (ACK) for uplink data.

For example, it is assumed in the procedure of FIG. 5 that the UE includes the release assistance information with ACK for uplink data. The release assistance information with ACK for uplink data may be information indicating that the ACK for uplink data is expected. Before the UE receives downlink data as ACK, the UE may transmit another uplink data or retransmit the uplink data previously transmitted. In this case, the MME does not transmit S1 message to the eNB because the downlink data as ACK is not yet received from the S-GW. However, because of this MME action, the eNB may be unable to know the UE ID allocated by the MME to identify the UE.

In order to solve the problem which may occur since the eNB cannot recognize the UE ID allocated by the MME, improved S1 signaling may be required. Hereinafter, the improved S1 signaling will be described in detail according to an embodiment of the present invention.

1. MME Transmits UE ID to eNB.

If an initial context setup procedure is not performed, an eNB is unable to know a UE ID allocated by an MME. Therefore, the MME needs to transmit the UE ID to the eNB. For example, the UE ID may be an MME UE S1AP ID.

For example, if the MME knows that the received uplink data does not expect ACK, the MME may transmit the UE ID to the eNB. For example, if the MME knows that the received uplink data does not expect ACK and knows that the received uplink data is not final one, the MME may transmit the UE ID to the eNB. For example, if the MME knows that downlink data is expected based on release assistance information, the MME may transmit the UE ID to the eNB. That is, if the release assistance information indicates that downlink data transmission subsequent to the uplink data transmission is expected, the MME may transmit the UE ID to the eNB. The release assistance information may be included in a NAS PDU. The NAS PDU may be included in an initial UE message. The initial UE message may be transmitted to the MEE by the eNB. For example, if the release assistance information indicates that downlink data transmission subsequent to uplink data transmission is expected and if the MME does not have a NAS PDU to be transmitted in downlink, the MME may transmit the UE ID to the eNB. That is, even if the release assistance information indicates that downlink data transmission subsequent to uplink data transmission is expected, when the MME does not receive downlink data from the P-GW, the MME may transmit the UE ID to the eNB.

The UE ID may include a connection establishment indication message. The connection establishment indication message may be transmitted to the eNB by the MME in the connection establishment indication procedure. The connection establishment indication procedure has a purpose of allowing the MME to complete a UE-associated logical S1-connection establishment. The connection establishment indication procedure uses UE-related signaling. The MME may allocate a unique MME UE S1AP ID to be used for the UE, and the allocated MME UE S1AP ID may be included in the connection establishment indication message. The connection establishment indication message may be defined as shown in Table 4.

TABLE 4

| IE/Group Name | Presence | Criticality | Assigned Criticality |
| --- | --- | --- | --- |
| Message Type | M | YES | Reject |
| MME UE S1AP ID | M | YES | Ignore |
| eNB UE S1AP ID | M | YES | Ignore |
| UE Radio Capability | O | YES | Ignore |

The Connection Establishment Indication procedure enables the MME to provide information to the eNB to complete the establishment of the UE-associated logical S1-connection after receiving INITIAL UE MESSAGE message, if the MME has no NAS PDU to send in DL in case of Control Plane CIoT EPS Optimization. If UE Radio Capability is not included, the eNB may be triggered so that the UE Radio Capability is requested to the UE, and the eNB may provide the UE Radio Capability to the MME in a UE CAPABILITY INFO INDICATION message.

Figure 6:
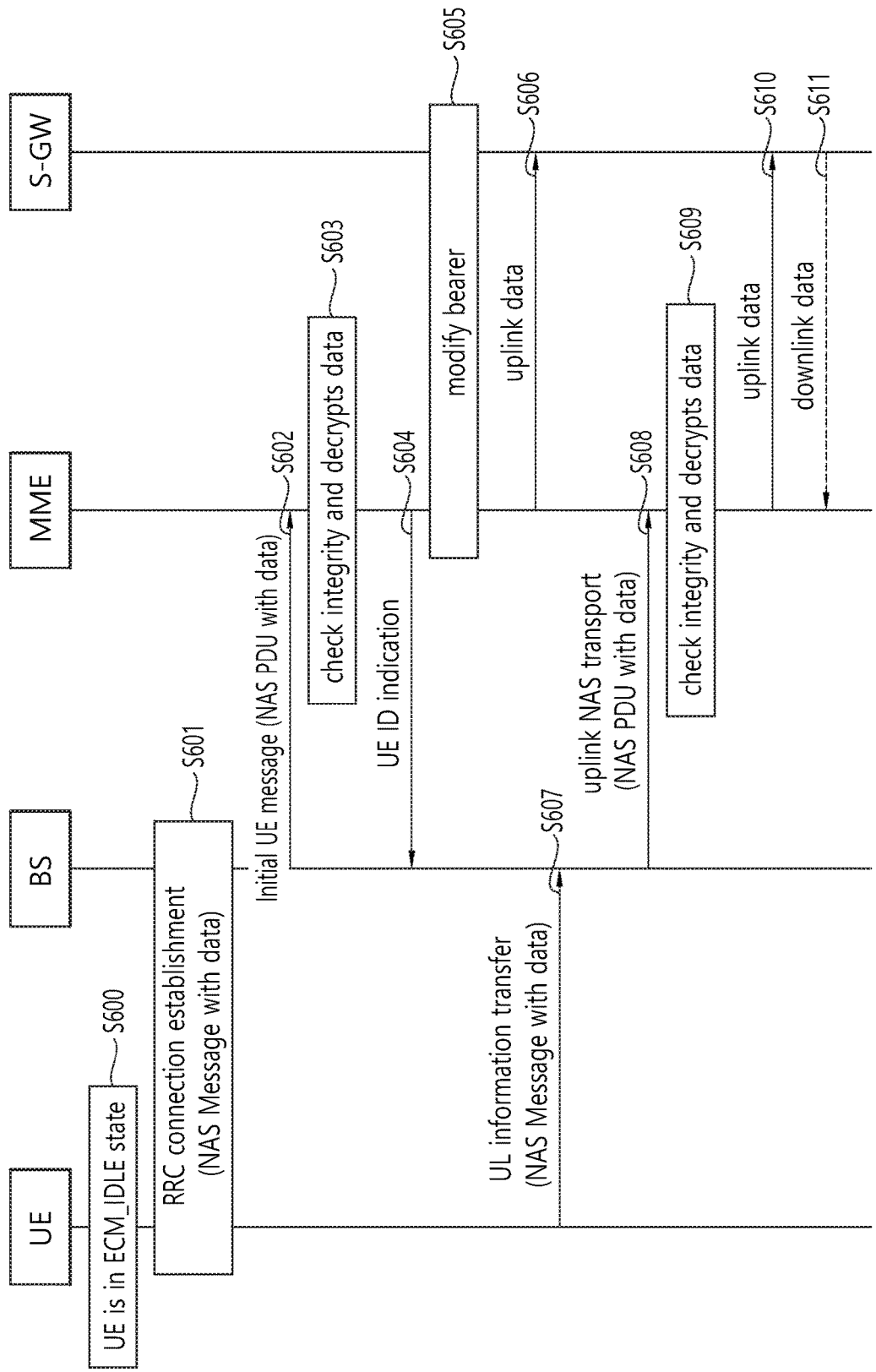
FIG. 6 shows a MO data transport procedure using NAS signaling according to an embodiment of the present invention.

FIG. 6 shows a MO data transport procedure using NAS signaling according to an embodiment of the present invention.

Referring to FIG. 6, in step S600, a UE may be in an ECM_IDLE state.

In step S601, the UE may establish a RRC connection. In addition, as a part of it, the UE may transmit encrypted and integrity protected uplink data in a NAS message. In addition, the UE may indicate release assistance information in the NAS message. The release assistance information may indicate whether downlink data transmission subsequent to the uplink data transmission is expected. For example, the release assistance information may indicate whether downlink data transmission is expected in response to uplink data. For example, the release assistance information may indicate whether ACK subsequent to uplink data is expected.

In step S602, the NAS message may be relayed to the MME by the eNB by using the initial UE message.

In step S603, the MME may check integrity of the NAS message PDU and decrypt data included therein.

In step S604, the MME may transmit a UE ID allocated by the MME to the eNB. The UE ID may be an MME UE S1AP ID. The UE ID may be included in a connection establishment indication message. Alternatively, the UE ID may be included in a UE ID indication message. Alternatively, the UE ID may be included in the existing message. If the MME knows that the received uplink data does not expect ACK, the MME may transmit the UE ID to the eNB. For example, if the MME knows that the received uplink data does not expect ACK and knows that the received uplink data is not final one, the MME may transmit the UE ID to the eNB. For example, if the MME knows that downlink data is expected based on the release assistance information, the MME may transmit the UE ID to the eNB. That is, if the release assistance information indicates that downlink data transmission subsequent to the uplink data transmission is expected, the MME may transmit the UE ID to the eNB. If the release assistance information indicates that downlink data transmission subsequent to uplink data transmission is expected and if the MME does not have a NAS PDU to be transmitted in downlink, the MME may transmit the UE ID to the eNB. That is, even if the release assistance information indicates that downlink data transmission subsequent to uplink data transmission is expected, when the MME does not receive downlink data from the P-GW, the MME may transmit the UE ID to the eNB.

In step S605, the MME may modify a bearer with the S-GW to transmit uplink data.

In step S606, the MME may transmit the uplink data to the S-GW.

In step S607, if the UE reports that uplink data received by the MME does not expect ACK and reports that the received uplink data is not final one, the UE may transmit next uplink data in a NAS message to the eNB by using a UL information transfer message.

If the UE reports to the MME that downlink data is expected based on release assistance information, the UE may retransmit uplink data previously received in the NAS message to the eNB by using the UL information transfer message, or may transmit another uplink data with ACK. The UL information transfer message may be transmitted before the UE receives downlink data as ACK.

In step S608, the eNB may transmit an uplink NAS transport message to the MME on the basis of the UE ID received from the MME. The uplink NAS transport message may include the NAS message received in step S607.

In step S609, the MME may check integrity of the NAS message PDU and decrypt data included therein.

In step S610, the MME may transmit the uplink data to the S-GW.

In step S611, if downlink data is expected based on release assistance information, the downlink data may arrive at the S-GW, and the S-GW may transmit the arrived downlink data to the MME. The release assistance information may be indicated by the UE in step S601.

2. eNB Transmits UE ID to MME.

If an initial context setup procedure is not performed, an eNB is unable to know a UE ID allocated by an MME. When the eNB cannot receive an S1AP message from the MME, the eNB may provide the MME with a NAS PDU with data and the UE ID via the S1AP message. After the eNB transmits the initial UE message, the eNB may receive a NAS message from the UE via a UL information transfer message.

Figure 7:
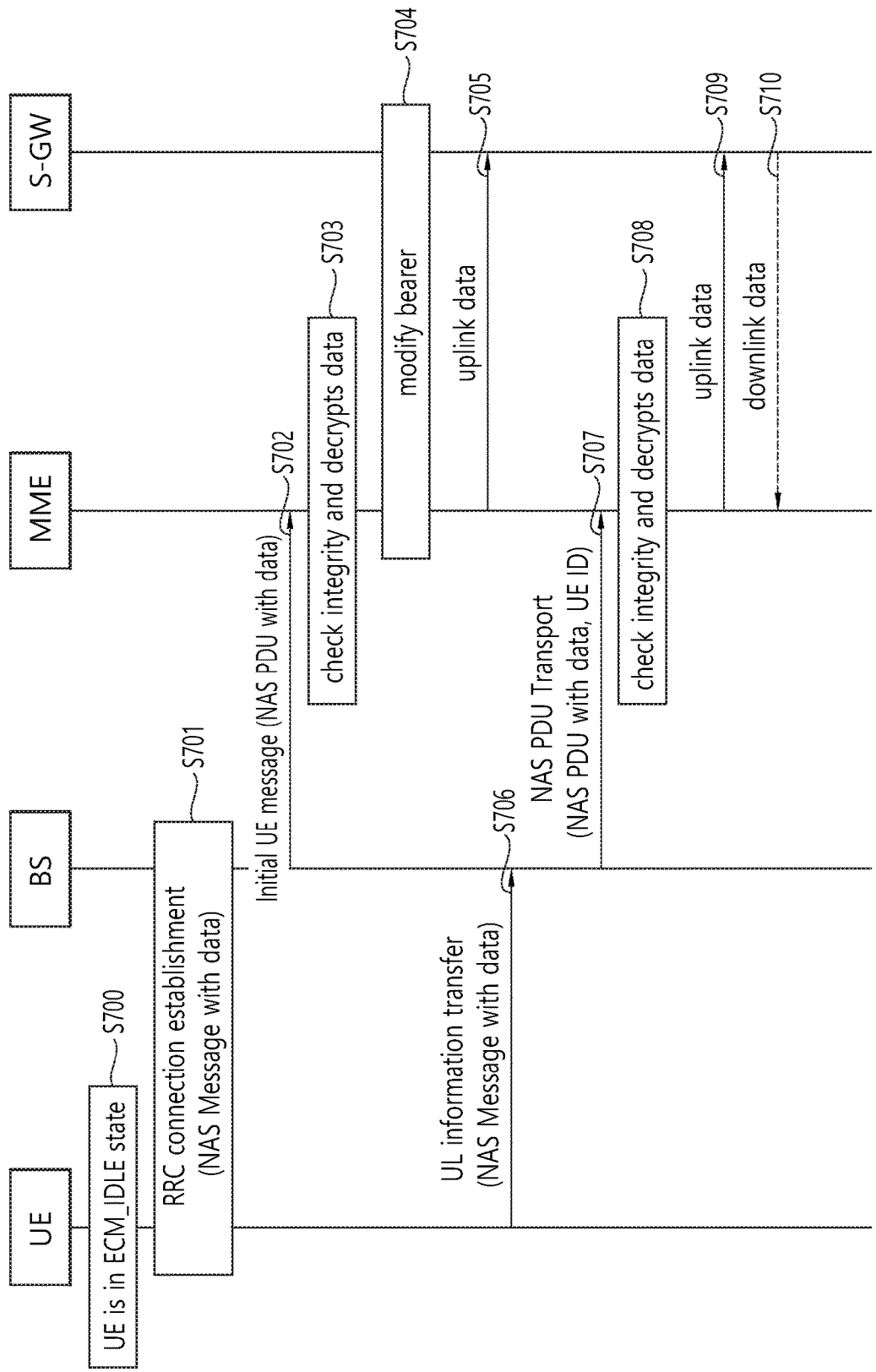
FIG. 7 shows a MO data transport procedure using NAS signaling according to an embodiment of the present invention.

FIG. 7 shows a MO data transport procedure using NAS signaling according to an embodiment of the present invention.

Referring to FIG. 7, in step S700, a UE may be in an ECM_IDLE state.

In step S701, a UE may establish a RRC connection. In addition, as a part of it, the UE may transmit encrypted and integrity protected uplink data in a NAS message. In addition, the UE may indicate release assistance information in the NAS message. The release assistance information may indicate whether downlink data transmission subsequent to the uplink data transmission is expected. For example, the release assistance information may indicate whether downlink data transmission is expected in response to uplink data. For example, the release assistance information may indicate whether ACK subsequent to uplink data is expected.

In step S702, the NAS message may be relayed to the MME by the eNB by using the initial UE message.

In step S703, the MME may check integrity of the NAS message PDU and decrypt data included therein.

In step 704, the MME may modify a bearer with an S-GW to transmit uplink data.

In step S705, the MME may transmit the uplink data to the S-GW.

In step S706, the UE may transmit next uplink data in a NAS message to the eNB by using a UL information transfer message. In addition, the UE may retransmit uplink data previously received in the NAS message to the eNB by using the UL information transfer message, or may transmit another uplink data with ACK. The UL information transfer message may be transmitted before the UE receives downlink data as ACK.

In step S707, the eNB may transmit a NAS PDU transport message to the MME. The NAS PDU transport message may include a UE ID and a NAS message received in step S706. For example, the UE ID may be an S-TMSI or a C-RNTI. Alternatively, the eNB may transmit the existing message to the MME. The existing message may include the UE ID and the NAS message received in step S706. For example, the UE ID may be the S-TMSI or the C-RNTI.

In step S708, on the basis of the UE ID included in the message received from the eNB, the MME may identify whether a UE which transmits uplink data through the NAS message is identical to a UE which has previously transmitted uplink data. In addition, the MME may check integrity of the NAS message PDU and decrypt data included therein.

In step S709, the MME may transmit the uplink data to the S-GW.

In step S710, if downlink data is expected based on release assistance information, the downlink data may arrive at the S-GW, and the S-GW may transmit the arrived downlink data to the MME. The release assistance information may be indicated by the UE in step S701.

Figure 8:
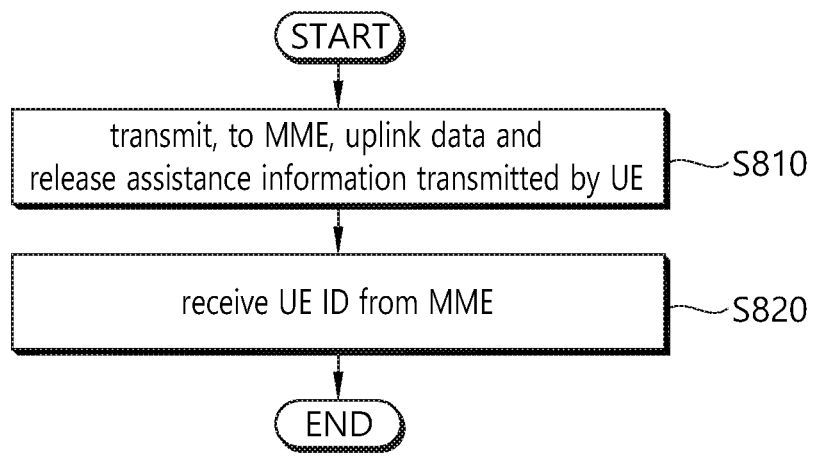
FIG. 8 is a block diagram showing a method of receiving a UE ID by an eNB according to an embodiment of the present invention.

FIG. 8 is a block diagram showing a method of receiving a UE ID by an eNB according to an embodiment of the present invention.

Referring to FIG. 8, in step S810, the eNB may transmit, to a mobility management entity (MME), uplink data and release assistance information transmitted by a UE. The release assistance information may indicate whether downlink data transmission subsequent to the uplink data transmission is expected.

In step S820, the eNB may receive the UE ID from the MME.

The UE ID may be received from the MME if the release assistance information indicates that the downlink data transmission subsequent to the uplink data transmission is expected. The uplink data and the release assistance information may be included in a NAS PDU. The NAS PDU may be included in an initial UE message.

The UE ID may be received from the MME if the MME does not receive data from a serving gateway (S-GW).

The UE ID may be included in a connection establishment indication message.

The UE ID may be received from the UE if the uplink data does not expect acknowledgement and the uplink data is not final data.

The eNB may transmit uplink NAS transport message including an NAS PDU to the MME on the basis of the received UE ID.

The UE may be in an EPS connection management (ECM)-IDLE state.

Figure 9:
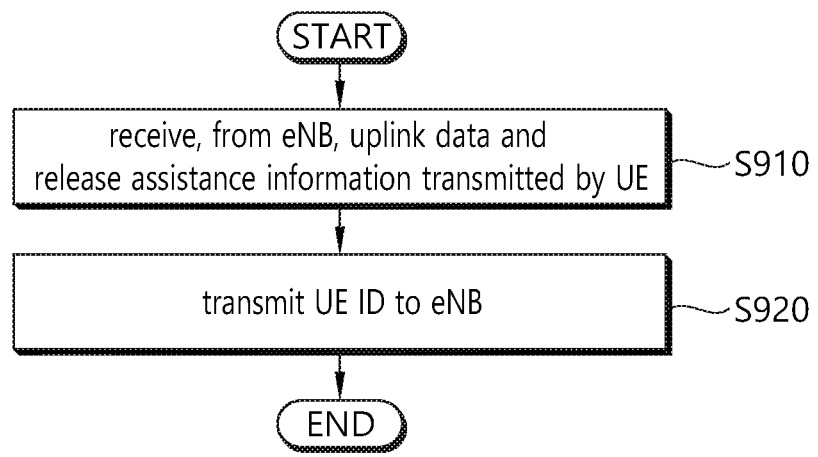
FIG. 9 is a block diagram showing a method of transmitting a UE ID by an MME according to an embodiment of the present invention.

FIG. 9 is a block diagram showing a method of transmitting a UE ID by an MME according to an embodiment of the present invention.

Referring to FIG. 9, in step S910, the MME may receive, from an eNB, uplink data and release assistance information transmitted by a UE. The release assistance information may indicate whether downlink data transmission subsequent to the uplink data transmission is expected.

In step S920, the MME may transmit the UE ID to the eNB.

The UE ID may be transmitted to the eNB if the release assistance information indicates that the downlink data transmission subsequent to the uplink data transmission is expected. The UE ID may be transmitted to the eNB if the MME does not receive data from a serving gateway (S-GW).

The UE ID may be transmitted to the eNB if the uplink data does not expect acknowledgement and the uplink data is not final data.

Figure 10:
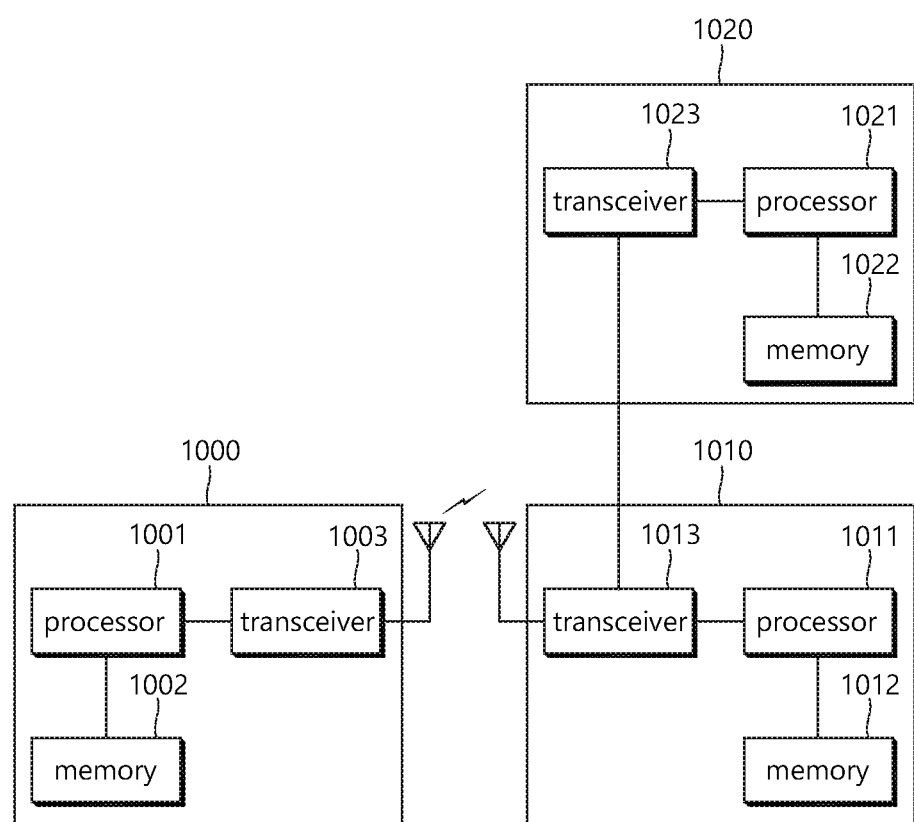
FIG. 10 is a block diagram illustrating a wireless communication system according to the embodiment of the present invention.

FIG. 10 is a block diagram illustrating a wireless communication system according to the embodiment of the present invention.

A UE 1000 includes a processor 1001, a memory 1002 and a transceiver 1003. The memory 1002 is connected to the processor 1001, and stores various information for driving the processor 1001. The transceiver 1003 is connected to the processor 1001, and transmits and/or receives radio signals. The processor 1001 implements proposed functions, processes and/or methods. In the above embodiment, an operation of the UE may be implemented by the processor 1001.

A BS 1010 includes a processor 1011, a memory 1012 and a transceiver 1013. The memory 1012 is connected to the processor 1011, and stores various information for driving the processor 1011. The transceiver 1013 is connected to the processor 1011, and transmits and/or receives radio signals. The processor 1011 implements proposed functions, processes and/or methods. In the above embodiment, an operation of the BS may be implemented by the processor 1011.

A MME 1020 includes a processor 1021, a memory 1022 and a transceiver 1023. The memory 1022 is connected to the processor 1021, and stores various information for driving the processor 1021. The transceiver 1023 is connected to the processor 1021, and transmits and/or receives radio signals. The processor 1021 implements proposed functions, processes and/or methods. In the above embodiment, an operation of the MME may be implemented by the processor 1021.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method of transmitting, by a user equipment (UE), release assistance information in a wireless communication system, the method comprising:
transmitting, to a base station (BS), uplink data; and transmitting, to the BS, release assistance information which informs that transmission of downlink data subsequent to transmission of the uplink data is expected, wherein an indication message including a UE identity (ID) is transmitted from a mobility management entity (MME) to the BS, based on the release assistance information.

2. The method of claim 1, wherein the UE ID is allocated by the MME.

3. The method of claim 1, wherein the uplink data and the release assistance information are transmitted by the BS to the MME.

4. The method of claim 3, wherein the uplink data and the release assistance information are included in an initial UE message.

5. The method of claim 1, wherein the UE ID is transmitted from the MME to the BS, when the release assistance information informs that transmission of the downlink data subsequent to transmission of the uplink data is expected.

6. The method of claim 1, wherein the UE ID is transmitted from the MME to the BS, based on the MME which does not receive data from a serving gateway (S-GW).

7. The method of claim 1, wherein the UE ID is transmitted from the MME to the BS, based on the uplink data which does not expect acknowledgement and is not final data.

8. The method of claim 1, wherein an uplink non-access stratum (NAS) transport message including an NAS protocol data unit (PDU) is transmitted by the BS to the MME, based on the UE ID.

9. The method of claim 1, wherein the UE is in an EPS connection management (ECM)-IDLE state.

10. A user equipment (UE) transmitting release assistance information in a wireless communication system, the UE comprising:
　　at least one transceiver;
　　at least one processor; and
　　at least one computer memory operably connectable to the at least one processor and storing instructions that, when executed, cause the at least one processor to perform operations comprising:
　　transmitting, to a base station (BS), uplink data; and
　　transmitting, to the BS, release assistance information which informs that transmission of downlink data subsequent to transmission of the uplink data is expected,
　　wherein an indication message including a UE identity (ID) is transmitted from a mobility management entity (MME) to the BS, based on the release assistance information.

11. The UE of claim 10, wherein the UE ID is allocated by the MME.

12. The UE of claim 10, wherein the uplink data and the release assistance information are transmitted by the BS to the MME.

13. The UE of claim 12, wherein the uplink data and the release assistance information are included in an initial UE message.

14. The UE of claim 10, wherein the UE ID is transmitted from the MME to the BS, when the release assistance information informs that transmission of the downlink data subsequent to transmission of the uplink data is expected.

15. The UE of claim 10, wherein the UE ID is transmitted from the MME to the BS, based on the MME which does not receive data from a serving gateway (S-GW).

* * * * *